Figure 1:
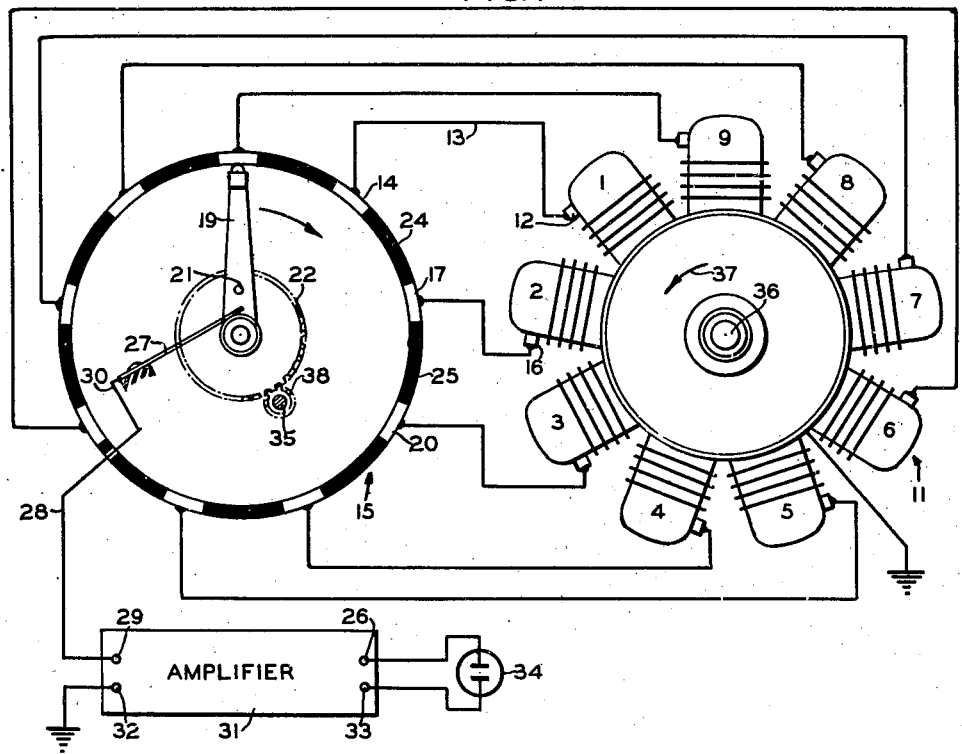

Jan. 18, 1949.  M. F. BATES  2,459,142
ELECTRICAL TEST APPARATUS
Filed Aug. 30, 1945  3 Sheets-Sheet 1

INVENTOR
MORTIMER F. BATES
BY
*Herbert V. Thompson*
HIS ATTORNEY

Jan. 18, 1949. M. F. BATES 2,459,142
ELECTRICAL TEST APPARATUS
Filed Aug. 30, 1945 3 Sheets-Sheet 3

INVENTOR
MORTIMER F. BATES
BY
HIS ATTORNEY

Patented Jan. 18, 1949

2,459,142

UNITED STATES PATENT OFFICE 2,459,142

ELECTRICAL TEST APPARATUS

Mortimer F. Bates, Brooklyn, N. Y., assignor to The Sperry Corporation, a corporation of Delaware Application August 30, 1945, Serial No. 613,621

8 Claims. (Cl. 177—311)

The present invention relates to synchronous switching systems, and is particularly concerned with a switching system especially adapted for use in conjunction with multi-cylinder engines for testing the operation of the different cylinders, in turn, during predetermined parts of the cylinder combustion cycles.

Electrical test systems for checking the performance of multi-cylinder engines have been arranged for performance indication commutated or selectively switched synchronously with the engine crankshaft rotation. For example, in connection with multi-cylinder internal combustion engines, oscillographic apparatus has been used for observation of the spark-discharge characteristics of electric ignition circuits, for checking the operation of the timer, or for testing the successively fired cylinders of an internal combustion engine for the detection of detonation.

While the present invention is particularly intended for use in detonation test systems, it is applicable to tests of other phases of performance of multi-cylinder engines. For detonation test purposes, an engine-driven selector switch having a rotary contact arm connected to an amplifying and indicating system, and having one stator contact element for each cylinder to be tested, has been arranged for contact arm rotation at a speed equal to the rotary speed of the engine camshaft. The stator contact elements, arranged symmetrically around the stator of this selector switch, are connected to detonation pickup devices on the respective cylinders of the engine. The order of connection of the stator contact elements is determined by the cylinder firing order of the engine.

Such a selector switch, constructed and applied to the engine in accordance with heretofore known principles, may closely resemble a timer switch or distributor switch of the type driven directly by the engine camshaft. At each time when the distributor switch makes a contact supplying a spark impulse to a cylinder of the engine, the rotary contact arm of the detonation test system is in contact with the selector switch stator element connected for testing the same cylinder; and when the movable element of the distributor or spark timing switch of the engine has been advanced by the camshaft sufficiently to provide an ignition impulse for the next cylinder in the engine firing order, the rotary contact arm of the detonation tester switch has similarly been advanced for a test of this next cylinder. Thus, the engine-driven selector switch couples the detonation test amplifier and indicator to the successive cylinders in the engine firing order, concurrently with the transmission to the cylinders of ignition spark impulses.

Such detonation test systems have been permanently installed in aircraft, where they are used continuously during aircraft engine operation for enabling the operator to maintain optimum adjustment of the engine fuel mixture and combustion conditions. It is well known that the fuel efficiency of the engines is increased as detonation-producing combustion conditions are approached, and that after the threshold of detonation has been passed, damage to the engine as well as a reduction in H. P. output characterize the engine operation. High fuel efficiency is of great importance in the operation of aircraft over long distances, but the protection of the aircraft engines from deterioration due to detonation is of equal importance. By continuous reliance upon a dependable detonation detection system, an aircraft operator is enabled to maintain the engines adjusted for the condition of maximum fuel efficiency, and at the same time to guard against deterioration-producing detonation.

A basic detonation detector system, including a magneto-striction detonation pickup unit, an amplifier and an indicator, is illustrated in U. S. Patent No. 2,275,675 to Charles S. Draper and Joseph H. Lancor, Jr. An aircraft detonation detection system for a multi-cylinder engine, employing a selector switch driven at camshaft speed, is set forth and claimed in patent application Serial No. 517,657, Joseph H. Lancor, Jr., filed January 10, 1944.

Where a detonation system of the type generally described above is provided for continuous use in an airplane, the engine-driven selector switch is subjected to appreciable wear, since it always rotates during the operation of the aircraft engine and since it rotates at a speed equal to the engine camshaft speed, i. e., a speed equal to one-half the engine crankshaft rotation speed.

It is an object of the present invention to provide a commutation system including an engine-driven selector switch operating at a materially reduced switch arm rotation speed and, accordingly, characterized by a long life of trouble-free smooth commutation.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In accordance with a feature of this invention, a selector switch contact arm is rotated at a fraction of the speed of the engine camshaft, and is arranged so that it is in engagement with any chosen stator contact element of the switch in synchronism with an ignition impulse of the associated engine cylinder, but is out of engagement with the chosen stator contact element during one or more next succeeding ignition impulses of said cylinder. Thus, the chosen stator contact element of a selector switch constructed in accordance with the present invention is employed for testing the performance of the cylinder to which it is connected only during alternate firings of the connected cylinder, or during every third firing, or during every fifth firing of the cylinder, for example, depending upon the precise arrangement of the engine-driven selector switch mechanism.

A preferred embodiment of the present invention is illustrated in Fig. 1 as applied to nine detonation pickup units on a nine-cylinder radial aircraft engine. Figs. 2, 3, 4 and 5 show a succession of different embodiments of the present invention associated with radial and "in-line" engines.

As illustrated in Fig. 1, a nine-cylinder radial aircraft engine 11 is provided with nine pickup units such as the pickup unit 12 indicated schematically on the first cylinder of the engine. Each of these pickup devices may comprise a metal casing attached to the wall of the cylinder and enclosing a solenoid winding. Through the axis of the winding is inserted a permanent magnet element which bears against or is connected to the wall of the engine cylinder. Such a pickup device may be so arranged that high frequency vibrations in the cylinder due to detonation cause magnetostrictive vibrations within the pickup device, so that an alternating voltage representing the high-frequency vibrations is generated in the pickup coil. One end of the coil is grounded on the cylinder of the aircraft engine, and the other end is connected to an output terminal on the pickup device. The details of each pickup unit may be made similar to those illustrated in the aforementioned U. S. Patent 2,275,675.

The output terminal of the detonation pickup device 12 on the first cylinder of the engine 11 is connected through a conductor 13 to the first contact segment 14 of an engine-driven selector switch 15. A detonation pickup unit 16 on the second cylinder of the aircraft engine is connected to a second stator contact element 17 of the selector switch 15. This switch 15 includes nine equally spaced stator contact elements such as elements 14 and 17, the nine stator contact elements being connected to the respective detonation pickup devices on the nine engine cylinders.

A rotary arm 19 connected as by rivets 21 to a gear 22 is provided within the selector switch 15 for engagement with the successive stator contact elements during the rotation of the gear 22. The arm 19 may be arranged for friction engagement with the stator contact elements. The selector switch stator assembly may include nine insulating arcuate spacers, such as the two representative spacers illustrated at 24 and 25, for physically separating the stator contact elements.

A resilient arm or brush as a phosphor bronze leaf spring 27 may be supported in the selector switch 15 for maintaining an electrical connection between a terminal 30 and the rotating contact arm 19.

A conductor 28 connects switch terminal 30 to one of the input terminals 29 of an amplifier 31, and the other input terminal 32 of the amplifier may be grounded as by a connection directly to the metallic housing of the engine 11. The output terminals 26 and 33 of the amplifier 31 may be connected to a neon lamp 34 which is caused to produce bright flashes when detonation occurs during the operation of the aircraft engine 11.

In accordance with a major feature of the present invention, the rotating arm 19 of the selector switch 15 is driven at a speed which represents a fraction of the engine camshaft speed. Accordingly, the contact element 14 associated with the pickup unit 12 on the first cylinder of the engine is engaged by the rotating contact arm 19 recurrently at a frequently which is a fraction of the frequency of ignition recurrence in the first cylinder of the engine.

The operation of the apparatus illustrated in Fig. 1 will now be described on the basis of 4-stroke cycle operation of the engine 11 with a conventional radial engine cylinder firing order designated: 1–3–5–7–9–2–4–6–8, and with the direction of rotation of the engine crankshaft 36 counterclockwise as viewed in Fig. 1, and as indicated by the arcuate arrow 37. A pinion 38 engaging the contact arm drive gear 22 has one-fifth as many teeth as the contact arm rotating gear 22. This pinion is connected as by a shaft 35 to the camshaft of the engine 11, the details of the connection being omitted from the drawing in the interest of clarity.

Immediately after the contact arm 19 reaches the stator contact element 14, the gases in the first cylinder of the engine 11 are ignited, and under normal conditions of operation of engine 11 no detonation will occur and only low-amplitude, low-frequency vibrations will be detected at cylinder 1, with the result that the indicator 34 will not be illuminated. If detonation occurs in the combustion of the gas in the first cylinder, the high-amplitude, high-frequency vibrations attendant therewith produce corresponding electrical output signals at the output of pickup unit 12, and through the cooperation of rotary arm 19 with contact element 14, the amplifier 31 is energized and the lamp 34 is illuminated, so that the operator is apprised of the detonation.

When the crank shaft of the engine 11 has rotated through 80° after the ignition of the first cylinder, the gases in cylinder No. 3 are ignited. Because of the gear ratio between the engine camshaft and the contact arm 19, the latter has only advanced through 8°. At this position, arm 19 may still be in contact with stator contact element 14, if the arcuate extent of element 14 is appreciably more than 8°. Cylinders 5 and 7 are ignited during the time interval required for the contact arm 19 to travel from the first stator contact element 14 along the arcuate spacer 24 toward the next stator contact element 17. Cylinder 9 may fire also during this interval, or the ignition of cylinder 9 may occur after arm 19 reaches contact element 17. It is immaterial whether arm 19 is in contact with a stator contact element during ignition of cylinders other than that cylinder to which the corresponding detonation pickup unit is connected. During the period of contact between arm 19 and contact element 17, the gases in the second cylinder of the engine are ignited, and if detonation occurs in this cylinder, the indicator 34 will be made to flash a warning to the aircraft operator.

Similarly, the contact arm 19 moves further along contact element 17, then along the next insulating spacer 26, and around to contact element 20 during the ignitions in turn of cylinders 4, 6, 8 and 1. The arm 19 is in full contact with contact element 20 at the time when the third cylinder is fired.

By tracing the operation of the detonation pickup selector switch 15 in relation to the operation of the 4-stroke cycle radial engine 11, it may be shown that the contact arm 19 is in engagement with stator contact element 14 at one firing of the first cylinder of the engine, and thereafter, the input circuit of amplifier 31 is isolated from contact with the detonation pickup on the first cylinder during the four next succeeding spark discharges in the first cylinder of the engine. The contact arm 19 is in engagement with the stator element 14 at every fifth firing of the first cylinder, so that if detonation repeatedly takes place within the first cylinder, the indicator 34 will be made to respond promptly, i. e., within ten revolutions of crankshaft 31, giving the operator ample warning of an undesirable engine operating condition.

If the shaft 31 of the engine 11 is operating at a speed of 1800 revolutions per minute, the rotary contact arm 19 operates at a speed of 180 revolutions per minute, a speed sufficiently low so that contact deterioration and mechanical wearing of the parts of selector switch 15 are minimized. At this speed of the engine, the operation of each cylinder is checked 180 times per minute, or at intervals of one-third second.

Figure 2:
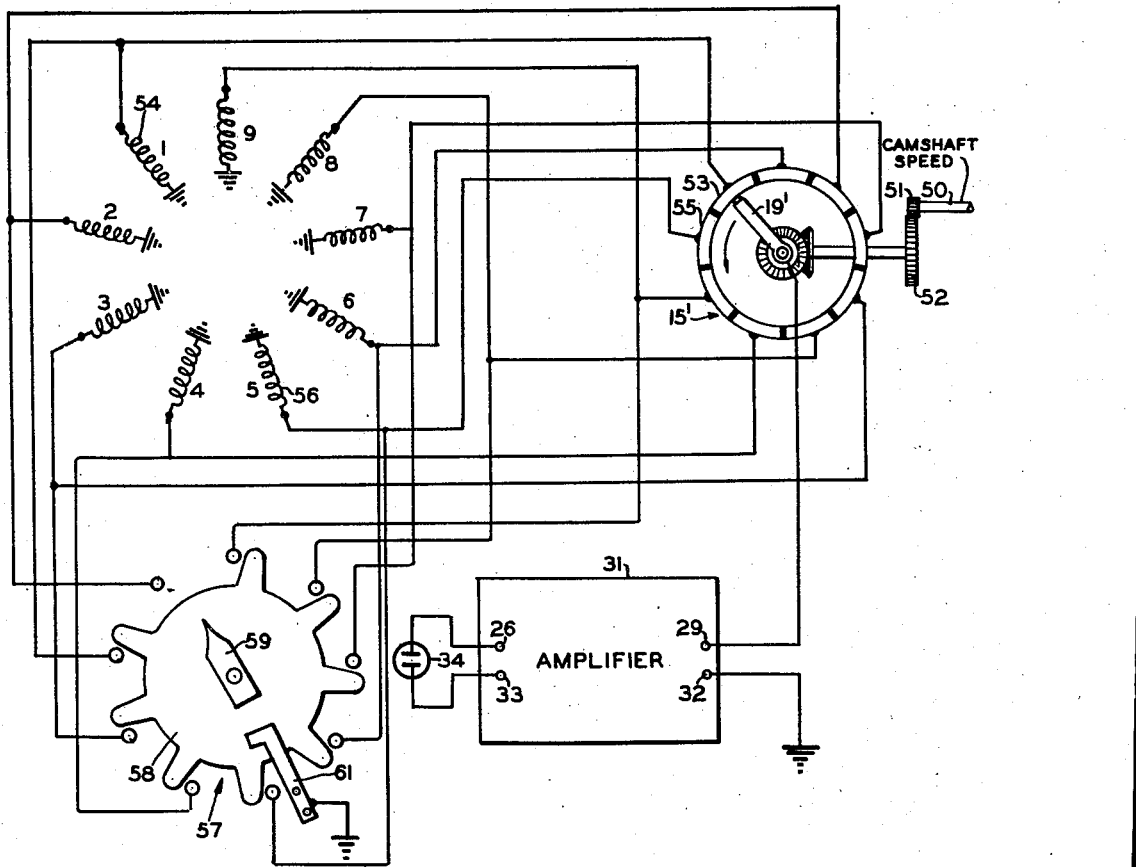

If, for any reason, it is desired that each cylinder of the radial engine be checked more frequently, a selector switch generally similar to that illustrated at 15 in Fig. 1 may be driven through a 2:1 speed reduction gearing as illustrated in Fig. 2. The outline of the nine-cylinder radial engine is not shown in this view, but instead the windings of the respective detonation pickup units are schematically indicated in a radial configuration corresponding to the arrangement of the respective engine cylinders.

The rotary contact arm 19' is driven by an extension 50 of the engine camshaft, through 2:1 speed reduction gears 51, 52. This rotary arm 19' of the selector switch 15' engages stator element 53 at the time of ignition of the first engine cylinder, and thus is connected to the coil 54 of the detonation pickup unit attached to the first cylinder. Thereafter, the third cylinder of the engine is ignited while the rotary contact arm 19' is midway between the contact element 53 and the next contact element 55 in the direction of advancement of contact arm 19'. Shortly thereafter, the contact arm 19' reaches the stator contact element 55, and the gas in the fifth cylinder of the engine is then ignited while the coil 56 of the fifth cylinder detonation pickup unit is connected through stator contact element 55 and the rotary contact arm 19' to the input terminal 29 of the amplifier 31. Continuing in this manner, a complete cycle of operation of the engine driven selector switch 15' may be traced, and it will be seen that any detonation resulting during alternate firings of any cylinder will be indicated by flashing of the indicator 34.

As illustrated in Fig. 2, a rotary switch 57 having nine stator contact elements spaced at 40-degree intervals and having also a rotatable disc with eight radially extending short-circuiting fingers at 40-degree intervals may be provided for grounding the outputs of all detonation pickup units except that on any selected cylinder. The disc 58 is grounded through a brush 61, and the stator contact elements of the switch 57 are connected to the pickup units associated with the respective cylinders of the engine. When a condition of detonation has been indicated by the illumination of indicator 34, an operator may determine whether the detonation condition is general to all of the engine cylinders or is occurring in only an isolated cylinder, and in the latter case, he may find which cylinder is characterized by the detonation, by rotating the eight-fingered disc 58 by means of the manual control knob 59, and observing the indicator lamp 34 during a few cycles of engine operation with knob 59 in each of the nine short-circuiting positions thereof.

Figure 3:
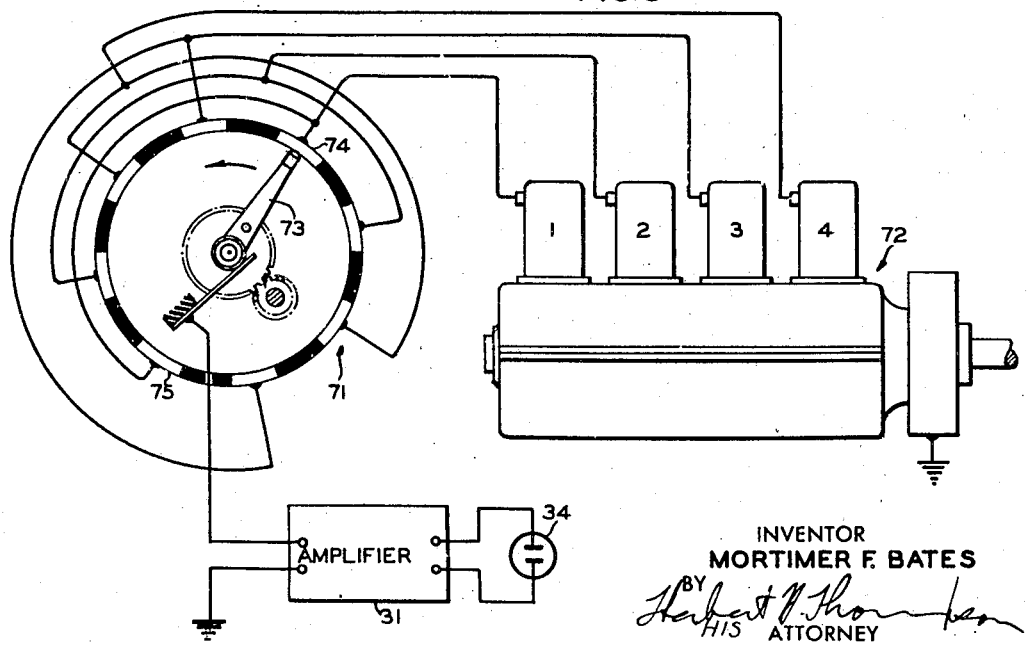

The present invention is not limited to use with radial engines, but is equally applicable to multi-cylindered engines having "in-line" cylinder arrangements. As illustrated in Fig. 3, a rotary selector switch 71 having eight equally spaced stator contact elements may be connected to detonation pickup units applied to the cylinders of a four-cylinder in-line engine 72. The contact arm 73 of the selector switch 71 may be driven at a speed equal to one-half the camshaft rotation speed of engine 72, so that it engages any selector switch stator contact element, as for example stator contact element 74, only at alternate ignitions of the gases in the first cylinder of the engine 72. The intervening ignitions of the gases in this cylinder occur when the contact arm 73 is in engagement with the diametrically opposite stator contact element 75.

With the arrangement illustrated in Fig. 3, which is based on a cylinder firing order designated 1-3-4-2, the rotary contact arm passes through 180 degrees during a complete cycle of operation of engine 72 including ignition of all of its four cylinders, and passes through the succeeding 180-degree arc of operation during the succeeding engine cycle. Thus, operation of the contact arm 73 at reduced speed is achieved and a detonation test is made at every time of ignition of an engine cylinder. The rotary selector switch arrangement illustrated in Fig. 3 has the disadvantage, however, that a plurality of stator contact elements are required for each cylinder of the engine 72, and accordingly the selector switch 71 is not so well adapted for compact construction as the types illustrated in Figs. 1 and 2, wherein only one stator contact element is provided for each cylinder.

Figure 4:
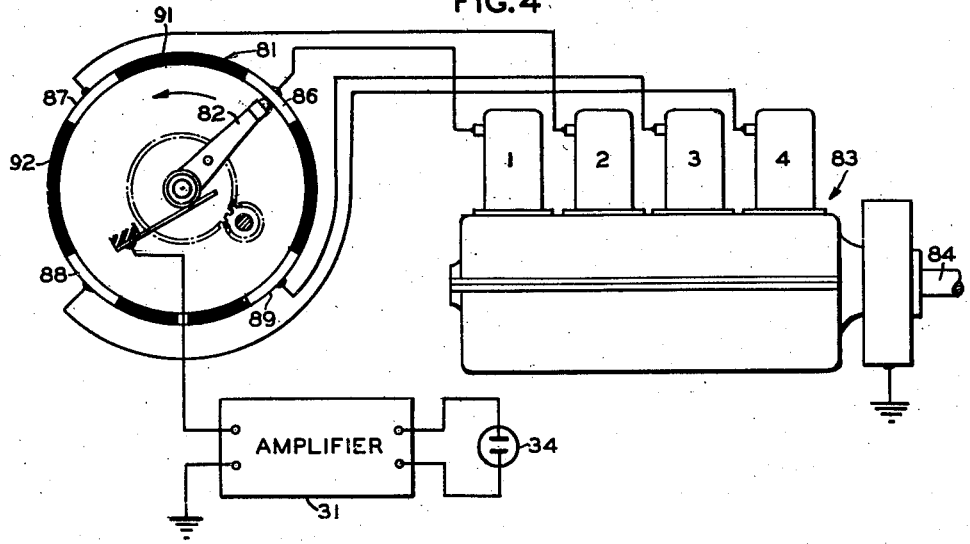
Figure 5:
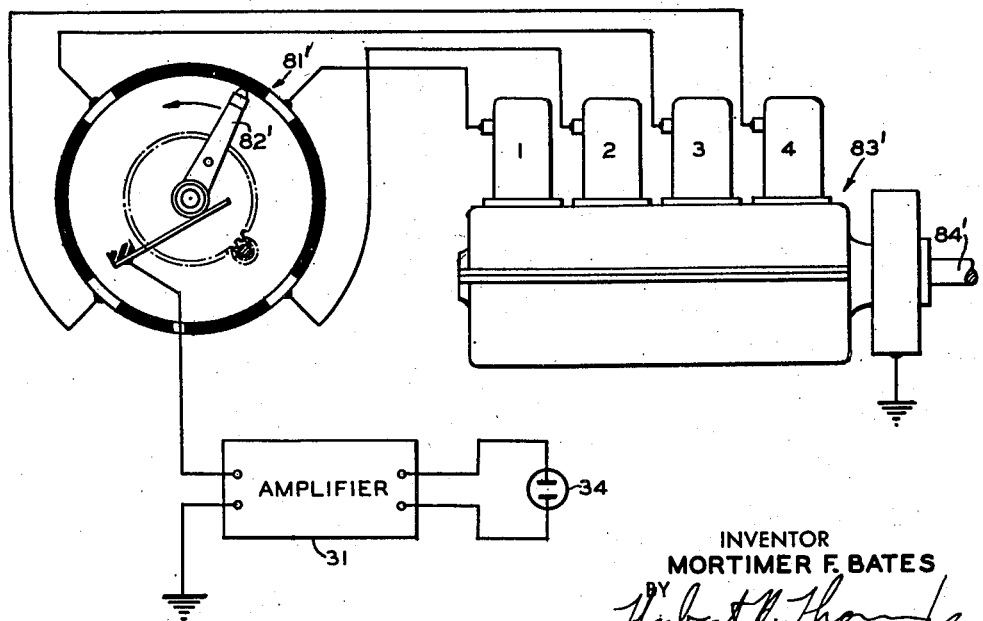

It is not necessary in the present invention that this type of construction with multiple contact elements for each cylinder be provided for use with an in-line engine. As illustrated in Figs. 4 and 5, a rotary selector switch 81 or 81' may be provided with one stator contact element for each detonation pickup unit, and the rotary contact arm 82 or 82' may be driven at a speed which is a fraction of the engine camshaft speed. As illustrated in Fig. 4, the contact arm 82 is rotated at a speed which is one-third of the camshaft speed and thus one-sixth of the crankshaft speed of an in-line engine 83; and as illustrated in Fig. 5, the rotary contact arm 83 is driven at a speed which is one-fifth of the camshaft speed of engine 83' and, accordingly, one-tenth of the speed of rotation of the crankshaft 84'.

In the arrangement illustrated in Fig. 4, the first cylinder of the engine is fired while the arm 82 is in contact with the first cylinder stator element 86 with the first cylinder. Thereafter, the third cylinder and then the fourth are fired as the arm 82 moves along the insulating spacer 91. Then the second cylinder of the engine is fired while the arm 82 engages contact element 87. Cylinders 1 and 3 are then fired while arm 82 moves along spacer 92, the fourth cylinder is fired while the arm 82 coacts with element 88, and after the successive firings of the second and first cylinders, the third cylinder is fired while the arm 82 cooperates with contact element 89.

The operation of the arrangement shown in Fig. 5 may similarly be traced, with due allowance for four successive cylinder firings during the movement of the contact arm 82' along each insulating spacer between contact elements.

As illustrated by the examples in Figs. 1, 2, 4 and 5, for any number $x$ of engine cylinders firing at regular intervals, a selector switch with $x$ stator contact elements may be constructed for checking the operation of every engine cylinder at each $n$th ignition thereof, where $n$ and $x$ have no common factors. Where the engine includes a very great number of cylinders, each stator contact element may be arranged to cooperate with the rotary contact arm of the switch during movement thereof through an arc greater than $$\frac{360°}{n}$$

so that the contact between the rotary arm and a stator contact element may be maintained through an interval corresponding to 180° rotation of the engine crankshaft. For a 4-stroke cycle engine, where the camshaft rotates at one-half the crankshaft rotation speed, the ratio of rotation speeds of the selector switch contact arm and the engine camshaft speed is $1:n$ and the ratio of rotation speeds of the contact arm and the engine crankshaft is $1:2n$.

The larger the ratio of the engine camshaft speed to the speed of rotation of the rotary switch contact arm, the less frequently are the ignition characteristics of any cylinder tested by the test apparatus. Thus, the optimum operating speed for the rotary selector switch may be determined by weighing the advantages of low-speed operation of the selector switch against any undesirability of very infrequent checks on the ignition characteristics of the successive cylinders.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for testing the operation of a cylinder of an engine at intervals equal to a predetermined multiple of the intervals between the work strokes of said cylinder, comprising test apparatus for testing the operation of said cylinder during a predetermined part of a work stroke, an electric switch coupling said test apparatus to said cylinder, and means synchronizing said switch with said engine for periodically operating said electric switch at a frequency equal to an integral fraction of the frequency of work strokes of said cylinder.

2. A system for testing the operations of the cylinders of a multi-cylinder engine, comprising test apparatus for testing the operation of said cylinders during cylinder work strokes, a selector switch coupled to said test apparatus and having a movable contact element and at least one stator contact element for each cylinder to be tested, means for coupling said stator contact elements to the respective cylinders of said engine, and means coupling said movable contact element to said engine for driving said movable contact element into successive engagements with said stator contact elements at such a speed that a selected stator contact element is engaged by said movable contact element at intervals equal to a predetermined multiple of the intervals between work strokes of the cylinder coupled to said selected element.

3. A system for testing the operations of the cylinders of a multi-cylinder engine at intervals equal to a predetermined multiple of the intervals between the work strokes of the cylinders, comprising test apparatus for testing the operation of a cylinder during the cylinder work stroke, a rotary selector switch coupled to said test apparatus for limiting the response thereof to one cylinder at one time, said selector switch having a rotatable contact element and also having equally spaced along a circle of movement of said rotary element a plurality of stator contact elements equal in number to the number of cylinders to be tested, means coupling said stator contact elements to the respective cylinders of said engine, and means coupling said rotary contact element to said engine for driving said rotary element into successive engagements with said stator contact elements at a speed of rotation less than half the speed of rotation of the engine crankshaft.

4. An electric system for detecting detonation of the cylinders of an internal combustion engine having a crankshaft and a plurality of combustion cylinders, comprising a detonation pickup unit coupled to each cylinder of said engine to be tested for producing an electric signal responsive to detonation, detonation test apparatus for receiving the signal produced by a detonation pickup unit and indicating the occurrence of detonation, a rotary selector switch for rendering said test apparatus successively responsive to the detonation pickup units on said cylinders in an order determined from the engine cylinder firing order, said rotary switch having a rotary contact element connected to said test apparatus and also having at least one cooperating stator contact element connected to each of said detonation pickup units, and coupling means interposed between said engine and said rotary contact element for driving said rotary element at a speed of rotation less than half the rotation speed of said crankshaft.

5. An electric system for detecting detonation of a plurality of cylinders of an internal combustion engine comprising a plurality of detonation pickup units, each coupled to one of said cylinders for producing detonation-responsive electric signals, detonation test apparatus for receiving the detonation-responsive signal from a pickup unit and indicating the occurrence of detonation, a rotary selector switch having a rotary contact element connected to said test apparatus and also having a stator contact element connected to each of said pickup units, the stator contact elements of said switch being equally spaced around the circular path of said rotary contact element for successive engagements with said rotary contact element, and mechanical coupling means interposed between said rotary contact element and said engine for rotating said rotary element through a fraction of a turn during the interval between successive work strokes of a selected cylinder.

6. An electric system for detecting detonation of the cylinders of an internal combustion engine having $x$ cylinders and a camshaft revolving at a rate equal to the recurrence rate of the engine firing cycles, comprising $x$ detonation pickup units connected respectively to the cylinders of said engine for producing detonation-responsive electric signals, detonation test apparatus for receiving the signal produced by a detonation pickup unit and indicating the occurrence of detonation, a rotary selector switch having $x$ regularly spaced stator contact elements coupled respectively to said detonation pickup units and also having a rotary contact element coupled to said test apparatus, and coupling means interposed between said engine and said rotary element for driving said rotary element at a speed of rotation $1/n$ times the speed of rotation of said camshaft, where $n$ and $x$ are numbers having no common factors.

7. Apparatus for regularly testing the performance of a plurality of elements regularly operating in a first operating order at intervals of a predetermined length, comprising an electrical tester, a commutator having a plurality of contact members and a cooperating relatively movable contactor, said contact members being connected respectively to said elements and said movable contactor being connected to said tester, means for moving said contactor around said elements in a sequence different from said operating order, and means for timing the operation of said contactor to one cycle of operation in a plurality of cycles of operation of said elements.

8. Apparatus for regularly testing the cyclical operation of a plurality of elements regularly operating in a predetermined operating order, comprising an electrical testing unit, a commutator having a plurality of contact members regularly spaced around a circular path therein and also having a rotary contactor for successively contacting said members during each rotation or cycle of said contactor, means connecting said rotary contactor to said electrical testing unit, means for connecting a first one of said elements to a first one of said contact members, means for regularly rotating said rotor contactor through one revolution per $n$ cycles of operation of said elements whereby said rotor contactor engages said first contact member at every $n$th operation of said first element and is displaced from contact with said first contact member during the intervening operations of said first element, and means connecting successive ones of said contact members around said commutator to the respective ones of said elements at intervals corresponding to every $n$th element to operate in said predetermined order.

MORTIMER F. BATES.

REFERENCES CITED

The following references are of record in the file of this patent:

UNITED STATES PATENTS

| Number | Name | Date |
|---|---|---|
| 2,343,240 | Molins et al. | Mar. 7, 1944 |
| 2,355,363 | Christaldi | Aug. 8, 1944 |